United States Patent [19]

Tornero

[11] Patent Number: 4,616,812
[45] Date of Patent: Oct. 14, 1986

[54] HYDROPNEUMATIC SPRING CYLINDER AND METHOD OF FILLING THE SAME

[76] Inventor: Lino E. Tornero, 629 Joyner St., Greensboro, N.C. 27403

[21] Appl. No.: 671,292

[22] Filed: Nov. 13, 1984

[51] Int. Cl.$^4$ ................................................ F16F 1/00
[52] U.S. Cl. .................................... 267/131; 297/345
[58] Field of Search ............... 267/113, 117, 120, 127, 267/131, 136, 64.11, 64.12, 64.28, 64.13; 188/322.17, 322.21, 322.19; 16/51, 66; 297/337, 339, 345, 347; 248/550, 566, 188.2, 654; 108/144

[56] References Cited

U.S. PATENT DOCUMENTS

| | | | |
|---|---|---|---|
| 3,197,191 | 7/1965 | Axthammer | 267/64.28 |
| 3,825,244 | 7/1974 | Bauer | 267/131 X |
| 4,108,416 | 8/1978 | Nagase et al. | 267/120 X |
| 4,335,871 | 6/1982 | Molders | 267/64.28 |
| 4,465,266 | 8/1984 | Hale | 267/131 |
| 4,469,010 | 9/1984 | Skover, Jr. et al. | 267/131 X |

Primary Examiner—Duane A. Reger
Assistant Examiner—Robert J. Oberleitner
Attorney, Agent, or Firm—Charles R. Rhodes; Judith E. Garmon

[57] ABSTRACT

A hydropneumatic spring in which a casing filled with fluid under pressure is selectively movable with respect to a piston contained within the casing and mounted on a stationary hollow support rod. The piston divides the casing into an upper and lower chamber. When the fluid path is unlocked or opened and the casing is subjected to axial pressure, fluid passes from one chamber to the other through the hollow support rod and axially through the piston.

6 Claims, 1 Drawing Figure

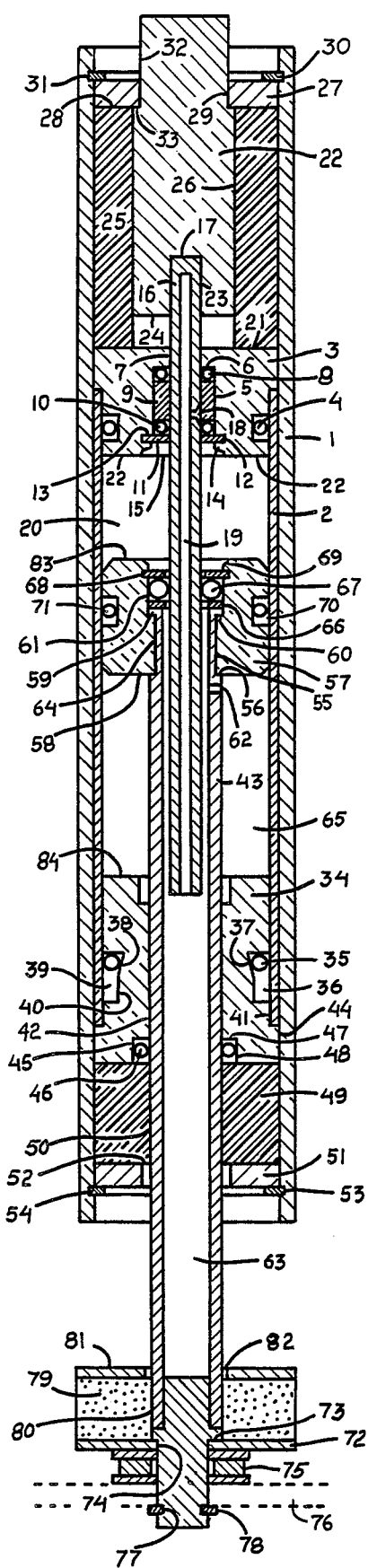

HYDROPNEUMATIC SPRING CYLINDER AND METHOD OF FILLING THE SAME

BACKGROUND AND SUMMARY OF THE PRESENT INVENTION

The present invention relates in general to hydropneumatic springs and more specifically to a new and improved technique for effecting a hydraulic or pneumatic spring by transferring fluids from one chamber to another axially through a hollow piston support rod.

Conventional hydropneumatic springs provide for the exchange of fluid under pressure between two internal chambers by means of an annular passage or gap defined between concentric tubes, or by a bypass valve and connecting orifice in the piston defining said chambers. Such approaches are complicated, may present safety hazards, and are not entirely satisfactory in operation because of difficulties which exist in maintaining the seals in a lubricated condition.

The present invention overcomes the aforesaid difficulties by transferring the fluid between an upper and lower chamber by means of a hollow tube that serves as the support rod for the piston separating and defining the chambers. As the fluid is transferred a lubricant may be transferred therewith causing an effective lubrication of all seals adjacent the spring fluid.

Toward this end the hydropneumatic spring of the present invention includes a cylindrical casing with upper and lower plugs adjacent each end, the casing containing a fluid under pressure. A hollow piston support rod extends through one of the closed ends of the casing in sealed, slidable and axially guidable relation thereto. The other end of the support rod supports a piston within the cylindrical casing in movable relation with respect to the inner wall thereof. The piston divides the casing into an upper chamber and a lower chamber and includes an axial passageway therethrough which receives the upper end of the hollow piston support rod for selectively establishing communication therethrough between the upper and lower chambers. A valve means selectively opens and closes the path of communication between the upper and lower chambers by passing the fluid from one of the chambers to the other chamber through the hollow piston support rod responsive to axial forces exerted on the hydropneumatic spring which tends to move the cylinder relative to the piston.

More specifically the valve means includes a hollow activating pin open at the bottom and closed at the top extending from a point above the upper plug, through an axial opening in the plug in sliding relation thereto, through the passageway in the piston, into the upper open end of the hollow piston support rod and down into the interior thereof. The activating pin is therefore in constant communication with the interior of the hollow support rod and may be activated from a point outside the casing. The wall of the hollow piston support rod includes an orifice therein below and in close proximity to the piston, thereby establishing communication between the lower chamber and the hollow interior of the piston support rod. The activating pin is selectively axially movable between a locking position and a fluid release position. The wall of the hollow activating pin also includes an orifice therein which is so positioned with respect to the upper plug that the orifice is closed by the upper plug in the locking position and in open free communication with the upper chamber in the fluid release position. Thus fluid communication between the upper and lower chambers is established through the piston support rod and activating pin responsive to axial movement of the activating pin.

Another feature of this invention is a main seal gland, referred to in the industry as a floating gland. Said floating gland is grooved to accept O-rings for sealing against the wall of cylinder and rod. In the past, conventional hydropneumatic springs have utilized annular, composite (elastomer-metal), seals with frustoconical geometries. Such types of seals are difficult and expensive to manufacture to close tolerances, and subject to erratic behavior and failure imposing serious safety hazards. The floating gland permits the use of the highly reliable and inexpensive O-ring seals while at the same time providing for an antifriction surface in contact with the rod.

Another feature of the invention is a main seal floating gland designed in the manner thus far described, but including a special cylinder groove partly chamfered to provide for a relief or relaxation area for the O-ring so that filling of the device is accomplished without the need for delicate and expensive annular frustoconical seals. A more detailed description of this feature occurs in subsequent parts of this specification.

Another feature of the invention is an internal cylinder liner guiding the piston and providing for the proper spacing between the upper plug assembly and the lower main seal and bearing assemblies.

Yet another feature of this invention is a cylinder casing provided with retaining means at both ends, of the groove and ring type, so as to prevent the need for crimping or otherwise cold forming the ends of said cylinder casing in order to retain the elements of the device therein, said forming operations being undesirable due to the need to diminish the diameter of a portion of said cylinder casing and the stresses incurred by said cylinder casing during such operations, all affecting the mechanical properties of said cylinder casing and therefore its ability to safely contain fluid under pressures higher than atmospheric.

Other objects, features, and advantages of the invention will become apparent from reading the detailed description of a preferred embodiment along with the accompanying drawing in which:

The sole figure shows a longitudinal cross-section of the device of the present invention.

DETAILED DESCRIPTION OF A PREFERRED EMBODIMENT

Referring to the figure, the preferred embodiment of the invention includes a cylinder 1 in which are contained or retained all components of the device. A liner 2 is arranged in fixed relation to the inner surface of cylinder 1 and in parallel and concentric alignment along the longitudinal axis thereof. The liner 2 serves to properly space the upper and lower end plugs within the device.

At one end of liner 2, which is sometimes referred to as the "top end" of the device, there exists a plug 3 in sealing contact against the upper internal surface of liner 2 by means of a seal 4. The plug 3 extends radially beyond the top of liner 2 so as to engage the inner surface of cylinder 1. A bore 5 extends upwardly into plug 3 along the axis thereof to a shoulder 6 with a smaller hole 7 continuing through to the end or upper surface 21 of plug 3. Within said bore 5 there is seated an upper O-ring 8 in sealing contact with shoulder 6 and the wall of bore 5, an annular elastomeric ring 9 in sealing contact with O-ring 8 and bore 5, and a lower O-ring 10 also in sealing contact with the inner surface of bore 5 and the upper surface of annular metal ring 11. The annular metal ring 11 is seated and retained in an annular bore 12, concentric to bore 5 but of larger diameter. The bore 12 provides an abutment 13 against which said annular metal ring 11 is retained by means of radially spaced protrusions 14 stamped on and radially spaced around the lower circumferential edge 15 of said bore 12.

An activating pin 16 extends in sealing and sliding contact through the internal diameters of O-rings 8 and 10, in sliding contact within the internal diameter of annular ring 9, and not in contact but also in axially concentric arrangement to hole 7 and annular metal ring 11, in such a way that activating pin 16 is free to slide along its longitudinal axis within the rings 8, 9, and 10 held by plug 3. The activating pin 16 is in the form of a hollow tube closed at its upper end 17 and provided with an orifice 18 in the wall thereof normally confronting elastomeric ring 9 in the locking position. An externally applied force on its upper end will cause the activating pin 16 to displace along the longitudinal axis of the device so that orifice 18 is moved to a point below the internal sealing surface of O-ring 10, thus defining a communicating passage between the internal space 19 within activating pin 16, orifice 18 and chamber 20 below the lower surface 15 of plug 3. Activating pin 16 is of such length that it extends down into the hollow piston support rod 43 as will be described hereinafter.

Activating pin 16 further extends upwardly beyond the top surface 21 of plug 3. An activating pin extension 22 is firmly and sealingly seated upon the upper portion of activating pin 16 by means of a bore 23. The lower surface 24 of the activating pin extension 22 is at an arbitrary distance from the top surface 21 of plug 3 so as to define the length of a stroke caused by the application of an external force upon said activating pin extension 22. A spacer 25 is located directly above and in contact with plug top 21 in such a manner that its internal bore 26 is in axial alignment with hole 7 and its outer surface is in sliding contact with the internal surface of cylinder 1 and therein contained. An annular metal ring 27 is similarly in contact with the upper end 28 of spacer 25 and its external surface exists in sliding contact with the internal surface of cylinder 1. Ring 27 contains a hole 29 concentric to the outer perimeter of said annular ring 27 and in axial alignment with bore 26. The annular metal ring 27 is restrained from axial displacement by the retainer ring 30 located directly above said annular ring 27 within a groove 31 around the upper perimeter in the internal surface of cylinder 1. Thus retainer ring 30 retains all components within the device. The activating pin extension 22 is normally biased upwardly to the illustrated position by the gas pressure within the casing and prevented from complete ejection from the device by means of a shoulder 32 of reduced diameter which provides for an abutment.

A main seal gland 34 serves as a plug for the lower end of cylinder 1 and defines uppermost extent of the cylinder stroke with respect to the piston 57. Seal 34 is located in sealing engagement within the internal perimeter and at the lower end of liner 2, by means of an O-ring 35 contained within a groove 36 around the external perimeter of said main seal 34. Main seal groove 36 constitutes a cavity within which said O-ring 35 in a relaxed state is free to occupy a main seal groove portion 37. The groove portion 37 being designed so as to exhibit essentially a trapezoidal cross-section and thus providing for a groove surface 38 which is at an angle preferably not greater than 10° with respect to the longitudinal axis of the device. Groove surface 38 is in sliding contact with the internal surface of O-ring 35 at a point where the diameter of the groove surface 38 is equal to the diameter of the internal surface of said O-ring 35. The groove surface 38 is thus in hermetically sealing contact with the internal surface of said O-ring 35 at all points where the diameter of the groove surface 38 is greater than the internal diameter of the O-ring 35 upon the longitudinal displacement of said O-ring 35. The groove 36 also includes a lower portion 39 of parallelogramic cross-section which provides a groove surface 40 of substantially smaller diameter than the internal surface of O-ring 35 and thus provides for sealing engagement of said O-ring 35 within said groove portion 39. The O-ring 35 is thus able to engage the groove 36 in momentary sealing and non-sealing contact and is also able to engage the internal surface of liner 2 in either momentary sealing or momentarily non-sealing contact. Further details regarding the aforementioned groove embodiment will be given in subsequent explanations regarding filling and pressurization of the device.

Liner 2 provides a seat for shoulder 41 on the external surface of main seal gland 34 and thus provides proper spacing between the upper and lower plugs of the device. Main seal gland 34 also includes a rod bore 42 through which a piston support rod 43 is free to axially reciprocate in sliding contact with the internal surface of said bore 42. An enlarged groove 45 is provided in main seal 34 on the lowermost perimeter of bore 42. An O-ring 46 is positioned within the cylindrical cavity created by said groove 45 to provide a fluid seal between the surfaces 47 and 48 of groove 45 and the surface of rod 43.

A slide bearing 49, located directly below and in contact with the lowermost surface of main seal 34 includes a central bore 50, the internal surface of which is in direct contact with the surface of rod 43, so as to provide for bearing guidance to said rod 43. The external surface of slide bearing 49 is in contact with the internal surface of cylinder 1 and thus contained therewith. The slide bearing 49 is made of an antifriction material. An annular metal ring 51 is located directly below and in contact with the lowermost surface of bearing 49. A retaining ring 54 is held within groove 53 in cylinder 1 to fix the lower plug components in place.

Piston support rod 43 is in effect a hollow tube and extends in axial and concentric alignment to liner 2 and cylinder 1, passing through bores 52, 50, and 42 for an arbitrary longitudinal distance. On the uppermost end of said rod 43, shoulder or section of reduced diameter 55 is provided creating a pair of spaced abutments 56, 60. A piston 57 is seated in shoulder 56 with the lower surface 58 thereof retained by said abutment 56. The piston 57 is firmly retained on support rod 43 by a flare 59 on the upper perimeter of rod 43 which extends radially over the abutment 60 created by an enlarged bore 61 in said piston 57. An interconnecting passage or orifice 62 extends radially through the wall of rod 43 a short distance below the lowermost surface 58 of piston 57 and connects the internal bore 63 with lower chamber 65.

Piston 57 includes a smaller bore 64 on a continuation of bore 67 through which is inserted rod 43. Within bore 61 there is provided an annular metal ring 66 the internal diameter of which is greater than the outer diameter of activating pin 16 and the external surface of which is in sliding contact with the internal surface of bore 61. An O-ring 67 is provided in sealing contact with said annular ring 66 and the external surface of activating pin 16 the entire length of the piston stroke. The external surface of said Oring 67 is also in sealing contact with the internal surface of bore 61. An upper annular ring 68 is provided within bore 61 with its lower surface in sealing contact with O-ring 67 and is retained therewtih by protrusions 69 staked along the upper perimeter of bore 61 in radial spacing.

A groove 70 on the external periphery of piston 57 houses an O-ring 71 in such a manner that said O-ring is in sealing contact with the surfaces defined by said groove 70 and in sliding and sealing contact with the internal surface of liner for the entire length of the piston stroke within said liner 2.

The diameter of rod 43 is reduced for a predetermined length from the lowermost end of rod 43 to accept an antifriction assembly. An annular metal ring 72 is installed against an abutment 73 by means of bore 74 therein. The internal surface of bore 74 is greater than the diameter of rod 43. A needle bearing 75 is installed on said rod 43 directly below the lowermost surface of annular ring 72. Indicated by dotted lines at this point is an external support structure 76 which is not an essential feature of the subject matter of the invention. A retaining ring groove 77 is located a short distance above the lowermost end of rod 43 and a retainer ring 78 is installed within said retainer ring groove 77, thus preventing the entire device from being withdrawn from the support structure 76. A shock absorbing elastomeric annular ring 79 rests on the upper surface of annular metal ring 72 and receives rod 43 through bore 80 therein. An annular metal ring 81 is also mounted on rod 43 in contact with the upper surface of annular elastomeric ring 79. The bore 82 in ring 81 is of a larger diameter than the outer diameter of rod 43 so as to be axially movably therealong.

All components of the device are assembled in accordance with the description hereinabove. An external force is axially applied upon activating pin 16 extension 22 so as to cause the axial displacement of activating pin 16 and the consequent positioning of orifice 18 below the sealing surface of O-ring 10. This is referred to as the "release." Thus a communicating passage is established between upper chamber 20, orifice 18, internal activating pin bore 19, internal rod bore 63, orifice 62 and chamber 65. This permits the free exchange of fluid contents from one chamber 20 onto another chamber 65. An external force parallel to the longitudinal axis of rod 43 is applied so as to cause the displacement of said rod 43 and piston 57 within the interior of liner 2 until the upper surface 83 of said piston 57 contacts the lower surface 15 of plug 3. This position of rod 43 and piston 57 within the device is called the maximum compressed or lowermost position.

At this point the device is placed within the interior of a pressurization chamber and said chamber pressurized to a pressure above atmospheric. As pressure surrounds the device, a fluid, preferably nitrogen gas, is introduced into the device through the gaps formed by the external surfaces of annular ring 51, slide bearing 49, main seal gland 34, internal surfaces of cylinder 1 and internal surface of liner 2 s these surfaces are not in sealing contact with each other. Fluid under high pressure thus reaches main seal groove 36. Should O-ring 35 be in a position of sealing contact with the surfaces of groove 36 and liner 2, it will be readily displaced to an upper position within said groove 36, that is section 37 of said groove 36 where aid groove section 37 provides ample volume to receive O-ring 35 and impede its sealing effect while allowing the pressurized fluid to enter chamber 65 through the gap between the external surface of main gland seal 34 and the internal surface of liner 2. When the pressure within the interior of the device is equal to the applied pressure, O-ring 35 relaxes and its sealing surfaces become once more in sealing contact with the surfaces of groove section 37 and liner 2.

The subsequent release of pressure within the pressurization chamber which contains the device causes a pressure differential between the exterior of the device, this being now atmospheric pressure, and the interior of the device, it being at a pressure higher than atmospheric. O-ring 35 is thus forced back into groove section 39 where, by virtue of its reduced diameter causes the desired sealing engagement between the internal diameter of O-ring 35, the groove surface, and the external diameter of O-ring 35 and the internal surface of liner 2. Because the pressure in chamber 20 is less than that of chamber 65 at any given moment, as the device is pressurized the piston 57 and rod 43 are displaced outwardly so that the bottom surface 58 of piston 57 reaches and becomes in contact with the upper surface 84 of main seal 34. Such displacement constitutes essentially the maximum allowable stroke for the device. At this point the piston 57 and rod 43 are said to be in the maximum extended or uppermost position.

Upon completion of the aforementioned pressurization, activating pin extension 22 and activating pin 16 are returned to the upper or "locking" position by virtue of the pressure within the device acting upon said elements in such a manner that orifice 18 is relocated at a point above the sealing surface of O-ring 10, and thus further communication between the chambers 65 and 20 is interrupted.

The voluntary activation of the device is made by the application of an external force upon the upper surface of activating pin extension 22 so that the orifice 18 on activating pin 16 is displaced and positioned at a point just below the internal sealing surface of O-ring 10 and thus again establishing communication between chambers 65 and 20. If at this time another external force is applied parallel to the longitudinal axis of the device and bearing essentially upon the surface of cylinder 1 and the free end of rod 43 so as to cause the relative motion of said cylinder 1 to said rod 43, an exchange of fluid is thus obtained between chambers 65 and 20 with the corresponding changes in the internal pressure of said chambers, in the manner usually and conventionally associated with hydropneumatic cylinders, more commonly known as gas springs.

What I claim is:

1. A hydropneumatic spring for use as an adjustable columnar support for such apparatuses as chairs, tables, stools, and the like requiring height or angle adjustments, said spring comprising:
   (a) a cylindrical casing including plug means for closing said casing adjacent each end and containing a fluid under pressure therein;

(b) a piston movably supported within said cylindrical casing with respect to the inner wall thereof, said piston dividing said casing into an upper chamber and a lower chamber and having an axial passageway therethrough for providing a path for said fluid therebetween;

(c) a hollow piston support rod having one open end thereof received in the passageway in said piston for defining said fluid path therethrough between said upper and lower chambers, the other end of said support rod extending through one of the closed ends of said casing in sealed, slidable, axially guidable relation thereto and being closed at the bottom end thereof;

(d) valve means for selectively opening and closing the fluid path between said upper and lower chambers by passing said fluid from one of said chambers to the other chamber through said hollow piston support rod responsive to axial forces exerted on said hydropneumatic spring which tend to move said cylinder relative to said piston.

2. The spring according to claim 1 wherein said valve means comprises:

(a) a hollow activating pin, open at the bottom and closed at the top, extending from a point above the plug closing the upper end of said cylindrical casing, through an axial opening in said plug in sliding relation thereto, through the passageway in said piston, into the opening in the upper end of said hollow piston support rod, and down into the interior thereof, whereby the open upper end of the hollow support rod is closed around the periphery of said activating pin in sealed sliding relation thereto, and the interior of the hollow support rod is in constant communication with the interior of said hollow activating pin and the activating pin is activated from a point outside the casing;

(b) the wall of said hollow piston support rod including an orifice therein below and in close proximity to said piston establishing a communication between said lower chamber and the hollow interior of said piston support rod;

(c) said activating pin being axially movable between a locking position and a fluid release position, the wall of said hollow activating pin also including an orifice therein, said orifice being so positioned with respect to said plug closing the upper end of said casing that said orifice is closed by said plug in the locking position and in open, free communication with the upper chamber in the fluid release position;

(d) whereby fluid communication between said upper and lower chambers is established through said piston support rod and said activating pin responsive to axial movement of said activating pin.

3. The spring according to claim 2 wherein the wall of said upper plug surrounding said opening includes an elastomeric ring therein in opposed relation to said orifice in said activating pin when in the locking position.

4. The spring according to claim 2 wherein said activating pin is normally biased to said locking position responsive to the pressure of said fluid within said casing.

5. The spring according to claim 2 wherein said cylinder casing contains a hollow tube liner, said liner providing guidance along an arbitrary distance or stroke for said piston within the interior surface thereof.

6. The spring according to claim 2 and further including shock absorbing means carried by said support rod for dampening the longitudinal displacement of said support rod relative to said cylinder casing.

* * * * *